United States Patent [19]
Curley et al.

[11] Patent Number: 5,920,359
[45] Date of Patent: Jul. 6, 1999

[54] VIDEO ENCODING METHOD, SYSTEM AND COMPUTER PROGRAM PRODUCT FOR OPTIMIZING CENTER OF PICTURE QUALITY

[75] Inventors: Lawrence David Curley, Endwell, N.Y.; Charles John Stein, Peckville, Pa.; Everett George Vail, III, Binghamton, N.Y.

[73] Assignee: International Business Machines Corporation, Armonk, N.Y.

[21] Appl. No.: 08/858,831

[22] Filed: May 19, 1997

[51] Int. Cl.$^6$ .................................................. H04N 7/50
[52] U.S. Cl. ........................ 348/699; 348/407; 348/413; 348/416
[58] Field of Search ........................... 348/699, 405, 348/407, 413, 416

[56] References Cited

U.S. PATENT DOCUMENTS

| | | | |
|---|---|---|---|
| 4,843,468 | 6/1989 | Drewery | 348/441 |
| 4,972,260 | 11/1990 | Fujikawa | 348/405 |
| 4,989,087 | 1/1991 | Pele et al. | 348/416 |
| 4,989,089 | 1/1991 | Chantelou et al. | 348/416 |
| 5,155,593 | 10/1992 | Yonemitsu et al. | 348/413 |
| 5,502,494 | 3/1996 | Auld | 348/426 |
| 5,508,743 | 4/1996 | Iizuka | 348/415 |
| 5,512,956 | 4/1996 | Yan | 348/606 |
| 5,771,073 | 6/1998 | Lim | 348/420 |

OTHER PUBLICATIONS

"Activity Detection", IBM Technical Disclosure Bulletin, vol. 34, No. 7B, Dec. 1991, pp. 217–219.

"Optimized Data Time Stamps for Digital Audio and Video on a Stochastic Network", IBM Technical Disclosure Bulletin, vol. 36, No. 09A, Sep. 1993, p. 183.

*Primary Examiner*—Howard Britton
*Attorney, Agent, or Firm*—Heslin & Rothenberg, P.C.

[57] ABSTRACT

A digital video encoding method, apparatus and computer program product are described with enhanced encoding of a picture having a plurality of macroblocks. The approach is to partition the picture into at least two regions and then to set or adjust at least one encoding parameter for each macroblock of the picture based upon the region of the picture within which the macroblock is located. As one specific implementation, the picture is partitioned into a center region and at least one outer region and the at least one encoding parameter is set to enhance picture quality in the center region at the expense of picture quality in the at least one outer region. The encoding parameter can, for example, be a motion estimation parameter, a quantization value, or a target bits per macroblock.

19 Claims, 7 Drawing Sheets

VIDEO ENCODING METHOD, SYSTEM AND COMPUTER PROGRAM PRODUCT FOR OPTIMIZING CENTER OF PICTURE QUALITY

TECHNICAL FIELD

This invention relates in general to compression of digital visual images, and more particularly, to temporal compression, that is redundancy between pictures. Redundancy between pictures is reduced, or even eliminated, through the use of motion vectors. This invention presents an encoder with adjustable motion estimation parameters and bit allocation based on location of a macroblock within the picture to optimize picture quality.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a picture and between pictures. Video compression within a picture is accomplished by conversion of the digital image from the time domain to the frequency domain by a discrete cosine transform, quantization, variable length coding, and Huffman coding. Video compression between pictures is accomplished via a process referred to as motion estimation, in which a motion vector plus difference data is used to describe the translation of a set of picture elements (pels) from one picture to another.

The ISO MPEG2 standard specifies only the syntax of bitstream and semantics of the decoding process. The choice of coding parameters and tradeoffs in performance versus complexity is left to the encoder developers.

One aspect of the MPEG2 compliant encoding process is the computational intensive nature of the operation. With a picture size of 720×480 pixels at 30 picture frames per second, a picture must be processed in 33.3 milliseconds. A 16×16 pixel macroblock (with 1350 macroblocks per picture) must, on average, be processed in less than 24.7 microseconds. A large portion of macroblock processing time is spent in the motion estimation process where the goal is to detect temporal redundancy and to use it to efficiently compress the picture. Processing of a macroblock in less than 25 microseconds is thus a limiting factor on picture quality.

Another aspect of the MPEG2 compliant encoding process is the specified bit rate for the encoded video stream. A bit rate is defined in bits per second. Based on the frame rate and type of picture being encoded, a number of bits per picture is assigned. For example, at 6,000,000 bits per second (6 Mbps), and pictures at 30 picture frames per second, each picture would be allocated 200,000 bits assuming the bits are allocated uniformly. With a 720×480 picture having 1350 macroblocks, this translates to 148 bits allocated per macroblock. As with the above-described motion estimation process constraint, the number of bits allocated per macroblock has an impact on picture quality.

In view of these constraints, the present invention seeks to enhance picture quality compared with conventional real-time video encoding processes.

SUMMARY OF THE INVENTION

Briefly described, the invention comprises in one aspect a method for processing a picture having a plurality of macroblocks. The method includes: partitioning the picture into at least two regions; and setting at least one encoding parameter for each macroblock of the picture based upon which region of the at least two regions of the picture the macroblock is located. As an enhancement, the at least two regions of the picture can comprise a center region of the picture and at least one outer region. The encoding parameter is set such that picture quality is enhanced in the center region of the picture at the expense of picture quality in the at least one outer region of the picture. Various encoding parameters are discussed for manipulation in accordance with this invention.

In another aspect, the method comprises a digital video encoder system for processing a picture having a plurality of macroblocks. The digital video encoder system comprises means for partitioning the picture into at least two regions and means for setting at least one encoding parameter for each macroblock of the picture. The at least two regions resulting from partitioning of the picture are employed by the means for setting to establish the at least one encoding parameter for each macroblock based upon which region of the at least two regions of the picture the macroblock is located. Various enhancements to the digital video encoder system are also described and claimed herein.

In a further aspect, the invention comprises a computer program product having a computer usable medium with computer readable program code means therein for use in processing a picture having a plurality of macroblocks. The computer readable program code means in the computer program product includes: computer readable program code means for causing a computer to affect partitioning of the picture into at least two regions; and computer readable program code means for causing a computer to affect setting of at least one encoding parameter for each macroblock of the picture based upon which region of the at least two regions of the picture the macroblock is located. The computer readable program code means for causing a computer to affect setting of the at least one encoding parameter is coded to enhance picture quality in a center region of the picture at the expense of picture quality in at least one outer region of the picture. Various encoding parameters, such as a motion estimatation parameter and/or target bits per macroblock can be adjusted to accomplish this objective.

To restate, presented herein is an approach for enhancing perceived picture quality based on controlling selected encoding parameters employed in a digital video encoder. Pursuant to the approach, the picture is initially partitioned into multiple regions, such as a center region and a peripheral region. An encoding parameter, such as a motion estimation parameter or target bits per macroblock, is then adjusted for each macroblock based upon the location of the macroblock within the multiple regions of the picture. The invention does not attempt to define the boundaries of the regions or the specific encoding parameters to be adjusted. Such details can be defined based on the source material, application or other criteria. The motion estimation and target adjustments are independent; however, both concepts can be employed together to provide a greater ability to selectively optimize picture quality.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
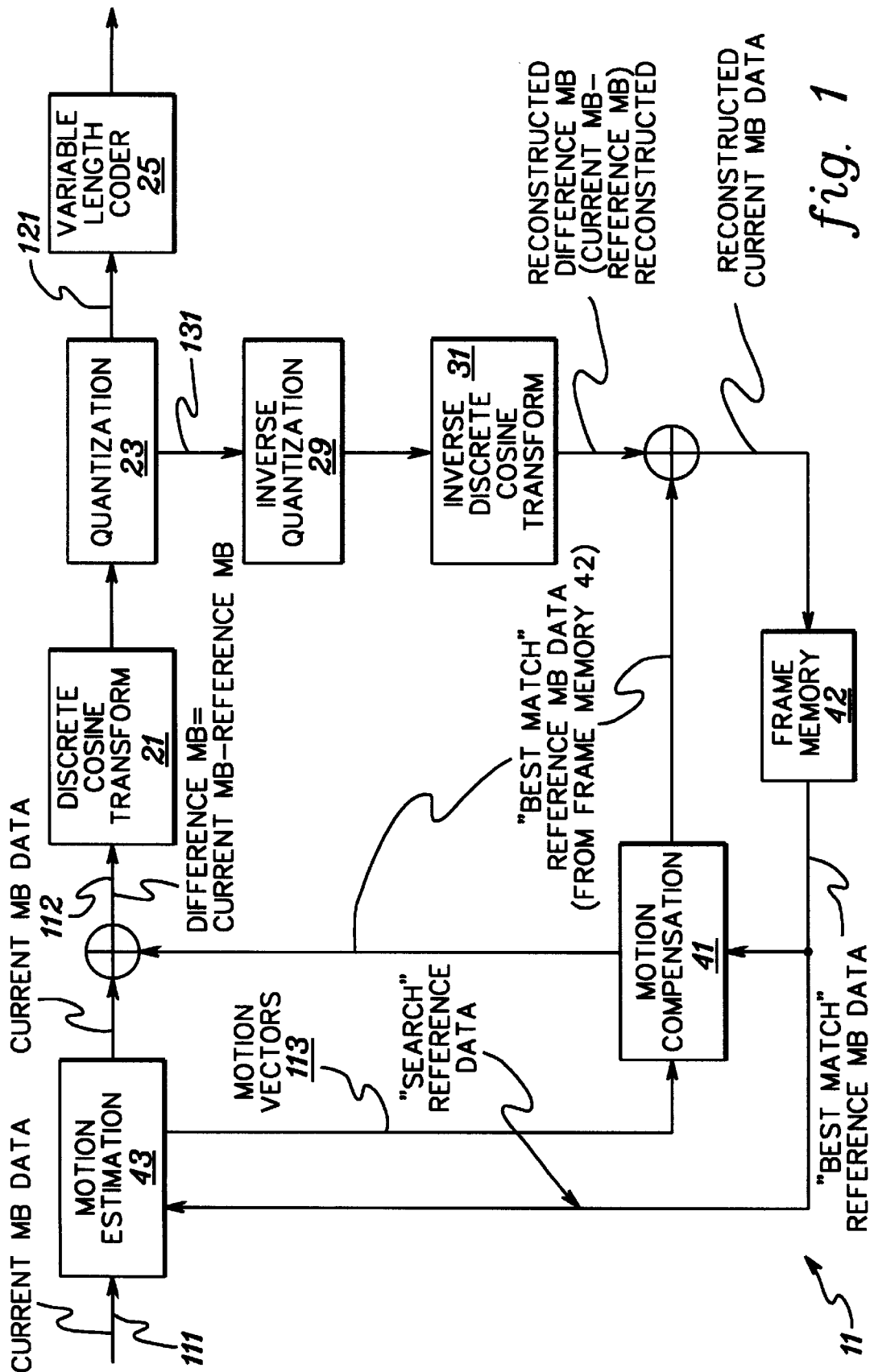
FIG. 1 shows a flow diagram of a generalized MPEG2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the ith picture input 111, difference data 112, motion vectors 113, the picture output 121, the feedback picture for motion estimation and compensation 131, and the motion compensated picture 101. This figure has the assumptions that the $i^{th}$ picture exists in Frame Memory or Frame Store 42, and that the $i+1^{th}$ picture is being encoded with motion estimation.

The invention relates to MPEG and HDTV compliant encoders and encoding processes. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are the temporal compression functions. Spatial and temporal compression are repetitive functions with high computational requirements.

More particularly the invention relates to a processor for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. Because of the block based nature of the motion compensation process, described below, it was desirable for the MPEG-2 Draft Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After transformation, many of the frequency coefficients are zero, especially the coefficients for high spatial frequencies. These coefficients are organized into a zig-zag pattern, and converted into run-amplitude (run-level) pairs. Each pair indicates the number of zero coefficients and the amplitude of the non-zero coefficient. This is coded in a Variable Length Code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

Figure 2:
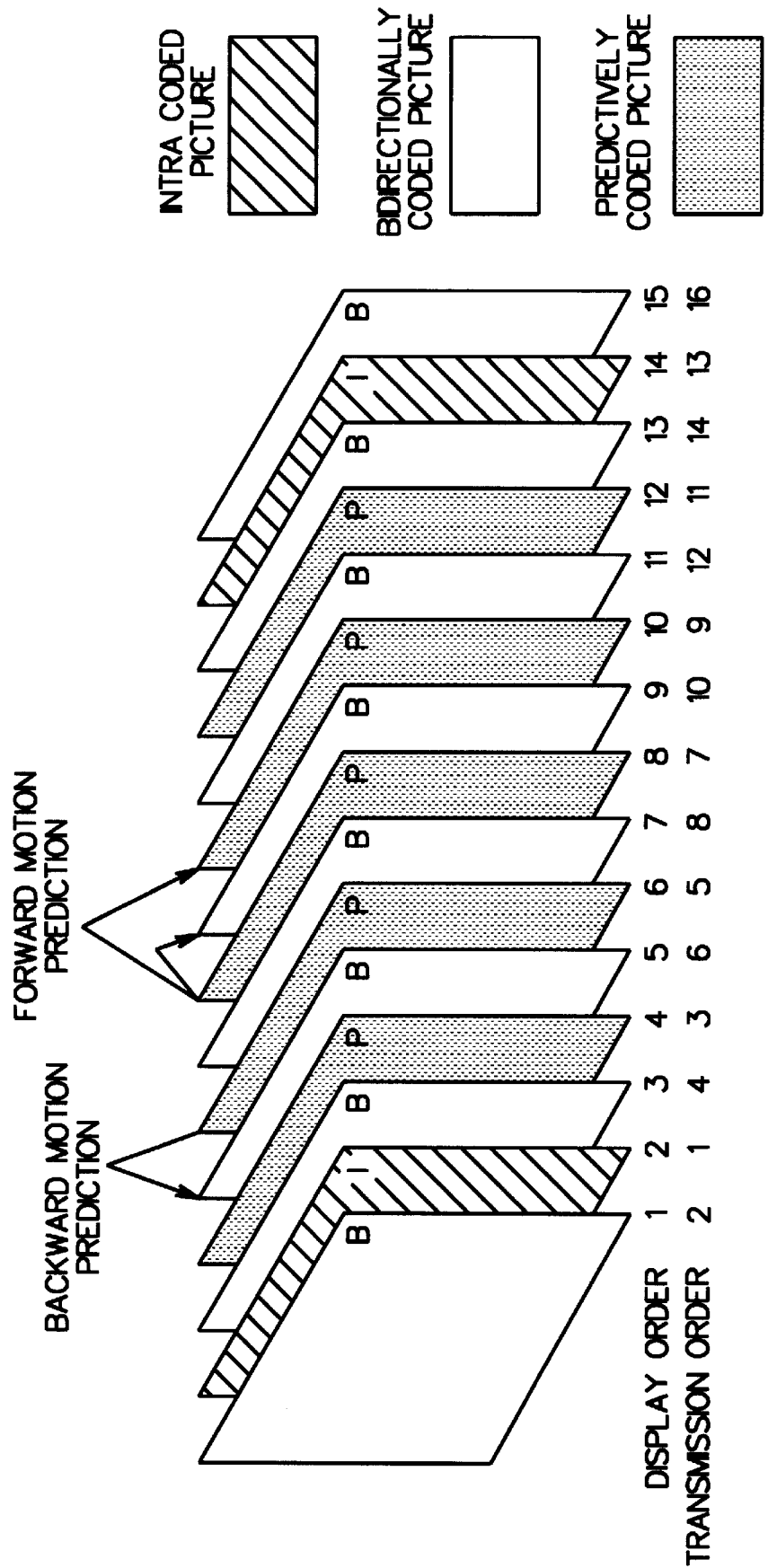
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures.

Figure 3:
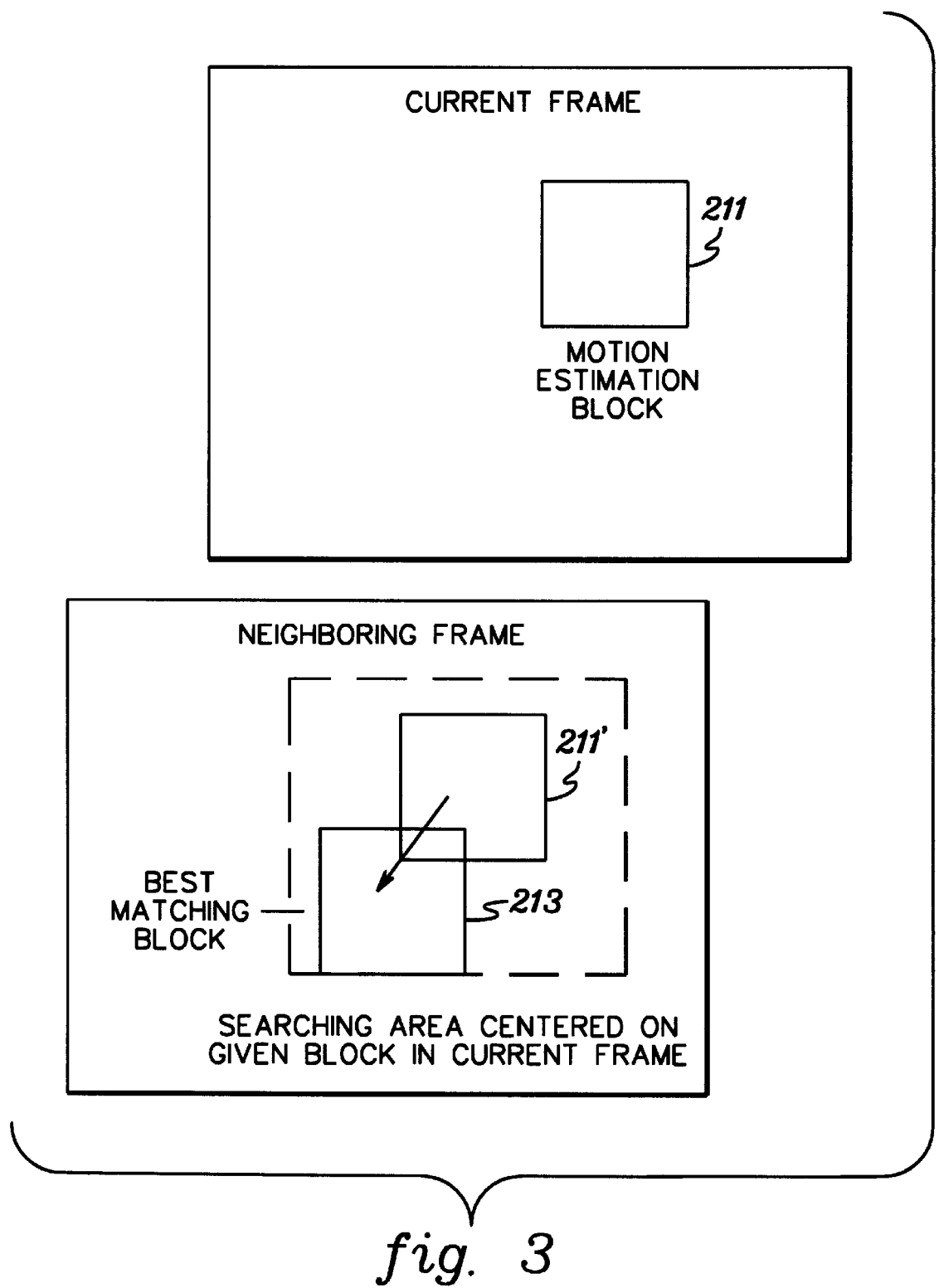
FIG. 3 illustrates the search from the motion estimation block in the current frame or picture to the best matching block in a subsequent or previous frame or picture. Elements 211 and 211' represent the same location in both pictures.
Figure 4:
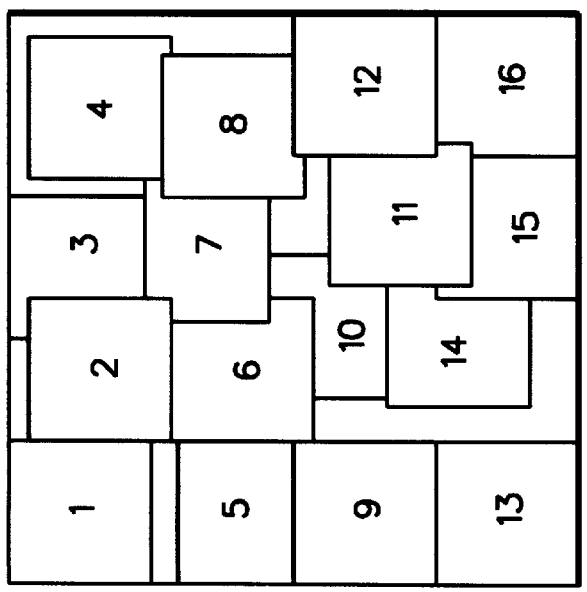
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout an area of the next picture to find the best match macroblock 213. Translating the macroblocks in this way yields a pattern of macroblocks for the $i+1^{th}$ picture, as shown in FIG. 4. In this way the ith picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG2 encoder are discussed in detail in commonly assigned, pending U.S. patent application Ser. No. 08/831-157, by Carr et al., filed Apr. 1, 1997, entitled "CONTROL SCHEME FOR SHARED-USE DUAL-PORT PREDICTED ERROR ARRAY," which is incorporated herein in its entirety.

As noted initially, perceived picture quality may be enhanced in accordance with the present invention by improving the picture quality in the center of the picture at the expense of picture quality at the perimeter of the picture. A flexible video encoder is described below in which boundaries or regions can be defined to establish, for example, center, intermediate and perimeter regions of the picture. The encoder can then adjust, for example, the motion estimation parameters and bit allocation of the macroblocks in the picture, to optimize picture quality based on which region the macroblock is in.

Real-time video encoding is a very compute intensive process. With a picture size of 720×480 pixels at 30 frames per second, a picture must be processed in 33.3 milliseconds. Assuming that there are 1350 macroblocks per picture, then a 16×16 pixel macroblock must, on average, be processed in less than 24.7 microseconds.

Of the available time, a large portion of macroblock processing time is spent in the motion estimation process 43 (FIG. 1) where the goal is to detect temporal redundancy and to use it to efficiently compress the picture. Thus, one way to maximize picture quality in accordance with the present invention is to spend more motion estimation processing time on the important sections of the picture. The most important area of the picture to visual perception is believed by Applicants to be the center of the picture since it typically draws a viewer's focus. The motion estimation processing time at the edges of the picture can be sacrificed in accordance with this invention for better quality in the center.

In MPEG2 video encoding, a macroblock may be encoded as a single 16×16 frame macroblock or a two separate interlaced 16×8 field blocks denoted as f1 and f2. The motion compensation steps consist of full-pel motion estimation, half-pel motion estimation, and dual prime motion estimation. The time to complete motion estimation, t(me), can be defined as:

$$t(me)=t(fp)+t(hp)+t(dp)$$

where:

t(fp)=time to complete full-pel (fp) motion estimation
t(hp)=time to complete half-pel (hp) motion estimation
t(dp)=time to complete dual-prime (dp) motion estimation Each step in the motion estimation process can be further broken down into the time to complete each search in that step. For example, the maximum number of possible full-pel motion estimation searches for a bi-directional frame encoded (B) picture are described below. Half-pel motion estimation has the same maximum number of searches.

| t(fp) = | t(fp_cfr_pfr) | + | t(fp_cfr_ffr) | + | t(fp_cfr_bfr) | + |
| | t(fp_cf1_pf1) | + | t(fp_cf1_pf2) | + | t(fp_cf1_ff1) | + |
| | t(fp_cf1_ff2) | + | t(fp_cf1_bfx) | + | | |
| | t(fp_cf2_pf1) | + | t(fp_cf2_pf2) | + | t(fp_cf2_ff1) | + |
| | t(fp_cf2_ff2) | + | t(fp_cf2_bfx) | | | | where
    t(fp_cfr_pfr)=fp current frame (cfr)/past ref. frame search time
    t(fp-cfr_ffr)=fp current frame/fut. ref. frame search time
    t(fp_cfr_bfr)=fp current frame/bidi ref. frame search time
    t(fp_cf1_pf1)=fp current field 1 (cf1)/past ref. field 1 search time
    t(fp_cf1_pf2)=fp current field 1/past ref. field 2 search time
    t(fp_cf1_ff1)=fp current field 1/fut. ref. field 1 search time
    t(fp_cf1_ff2)=fp current field 1/fut. ref. field 2 search time
    t(fp_cf1_bfx)=fp current field 1/bidi ref. field search time
    t(fp_cf2_pf1)=fp current field 2 (cf2)/past ref. field 1 search time
    t(fp_cf2_pf2)=fp current field 2/past ref. field 2 search time
    t(fp_cf2_ff1)=fp current field 2/fut. ref. field 1 search time
    t(fp_cf2_ff2)=fp current field 2/fut. ref. field 2 search time
    t(fp_cf2_bfx)=fp current field 2/bidi ref. field search time
    "/"=searched against

Figure 5:
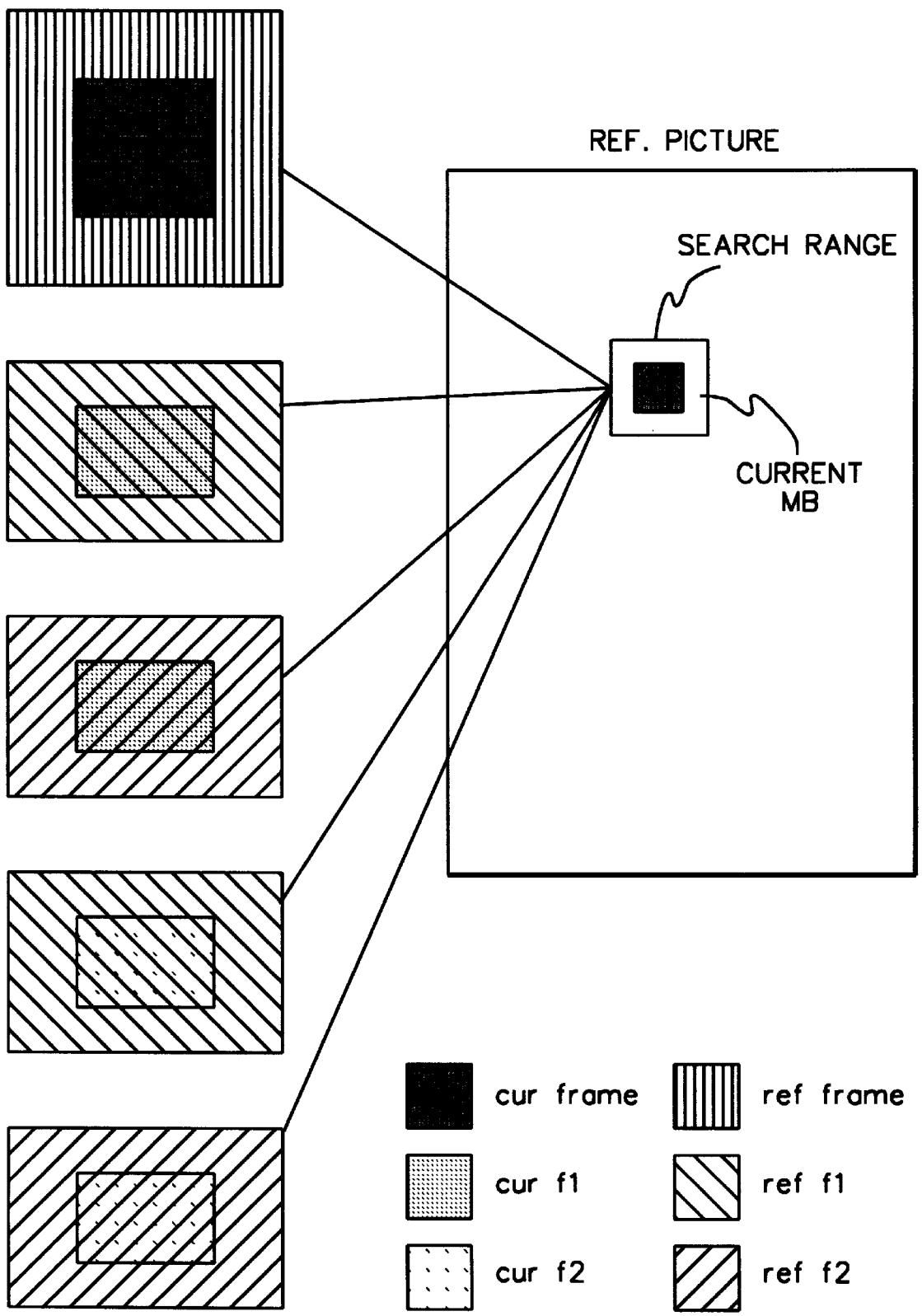
FIG. 5 shows a predictably encoded (P) picture which depicts the maximum number of full-pel motion estimation searches, including a: current macroblock frame/past macroblock frame reference search; current field 1/past reference field 1 search; current field 1/past reference field 2 search; current field 2/past reference field 1 search; and current field 2/past reference field 2 search.

| t(hp) = | t(hp_cfr_pfr) | + | t(hp_cfr_ffr) | + | t(hp_cfr_bfr) | + |
| | t(hp_cf1_pf1) | + | t(hp_cf1_pf2) | + | t(hp_cf1_ff1) | + |
| | t(hp_cf1_ff2) | + | t(hp_cf1_bfx) | + | | |
| | t(hp_cf2_pf1) | + | t(hp_cf2_pf2) | + | t(hp_cf2_ff1) | + |
| | t(hp_cf2_ff2) | + | t(hp_cf2_bfx) | | | | where
    t(hp_cfr_pfr)=hp current frame/past ref. frame search time
    t(hp_cfr_ffr)=hp current frame/fut. ref. frame search time
    t(hp_cfr_bfr)=hp current frame/bidi ref. frame search time
    t(hp_cf1_pf1)=hp current field 1/past ref. field 1 search time
    t(hp_cf1_pf2)=hp current field 1/past ref. field 2 search time
    t(hp_cf1_ff1)=hp current field 1/fut. ref. field 1 search time
    t(hp_cf1_ff2)=hp current field 1/fut. ref. field 2 search time
    t(hp_cf1_bfx)=hp current field 1/bidi ref. field search time
    t(hp_cf2_pf1)=hp current field 2/past ref. field 1 search time
    t(hp_cf2_pf2)=hp current field 2/past ref. field 2 search time
    t(hp_cf2_ff1)=hp current field 2/fut. ref. field 1 search time
    t(hp_cfp2_ff2)=hp current field 2/fut. ref. field 2 search time
    t(hp_cf2_bfx)=hp current field 2/bidi ref. field search time A predictively encoded (P) picture contains the following maximum number of full-pel motion estimation searches as illustrated in FIG. 5. Half-pel motion estimation has the same maximum number of searches.

| t(fp) = | t(fp_cfr_pfr) | + | | |
| | t(fp_cf1_pf1) | + | t(fp_cf1_pf2) | + |
| | t(fp_cf2_pf1) | + | t(fp_cf2_pf2) | |
| t(hp) = | t(hp_cfr_pfr) | + | | |
| | t(hp_cf1_pf1) | + | t(hp_cf1_pf2) | + |
| | t(hp_cf2_pf1) | + | t(hp_cf2_pf2) | |

Dual prime motion estimation can only be performed on predictively encoded (P) pictures and consists of the following searches:

$$t(dp)=t(dp\_cf1\_pf2)+t(dp\_cf2\_pf1)$$

where
    t(dp_cf1_pf2)=dp current field 1/past ref. field 2 search time
    t(dp_cf2_pf1)=dp current field 2/past ref. field 1 search time Time required to complete the motion estimation steps is controlled by several factors. One factor is the circuitry used to perform the motion estimation. The speed and amount of circuitry present and the efficiency of the design (e.g., pipelining, dataflow implementation, etc.) play an important role in determining the time needed to complete motion estimation. The circuitry characteristics in an encoder are fixed in hardware and are therefore not adjustable.

The time to complete motion estimation processing is proportional to the total number of searches performed and the size of the search area in each search. A larger search area generally leads to better compression since there is a greater opportunity to find better matching reference data. However, the time required to search an area of reference data increases as the size of the search area increases.

In a specific encoder implementation, the circuitry, motion estimation steps, number of searches per step, and search area size must all be balanced in order to meet the processing time requirements per macroblock. Conventionally, these features are all uniformly balanced across a picture. Balancing is accomplished by performing an identical motion estimation process on each macroblock and ensuring that the total processing time of the macroblock is less than, for example, 24.7 microseconds. In accordance with the present invention, these motion estimation parameters are varied for each macroblock depending upon which region of two or more regions of the picture the macroblock is in so as to enhance perceived picture quality.

Figure 7:
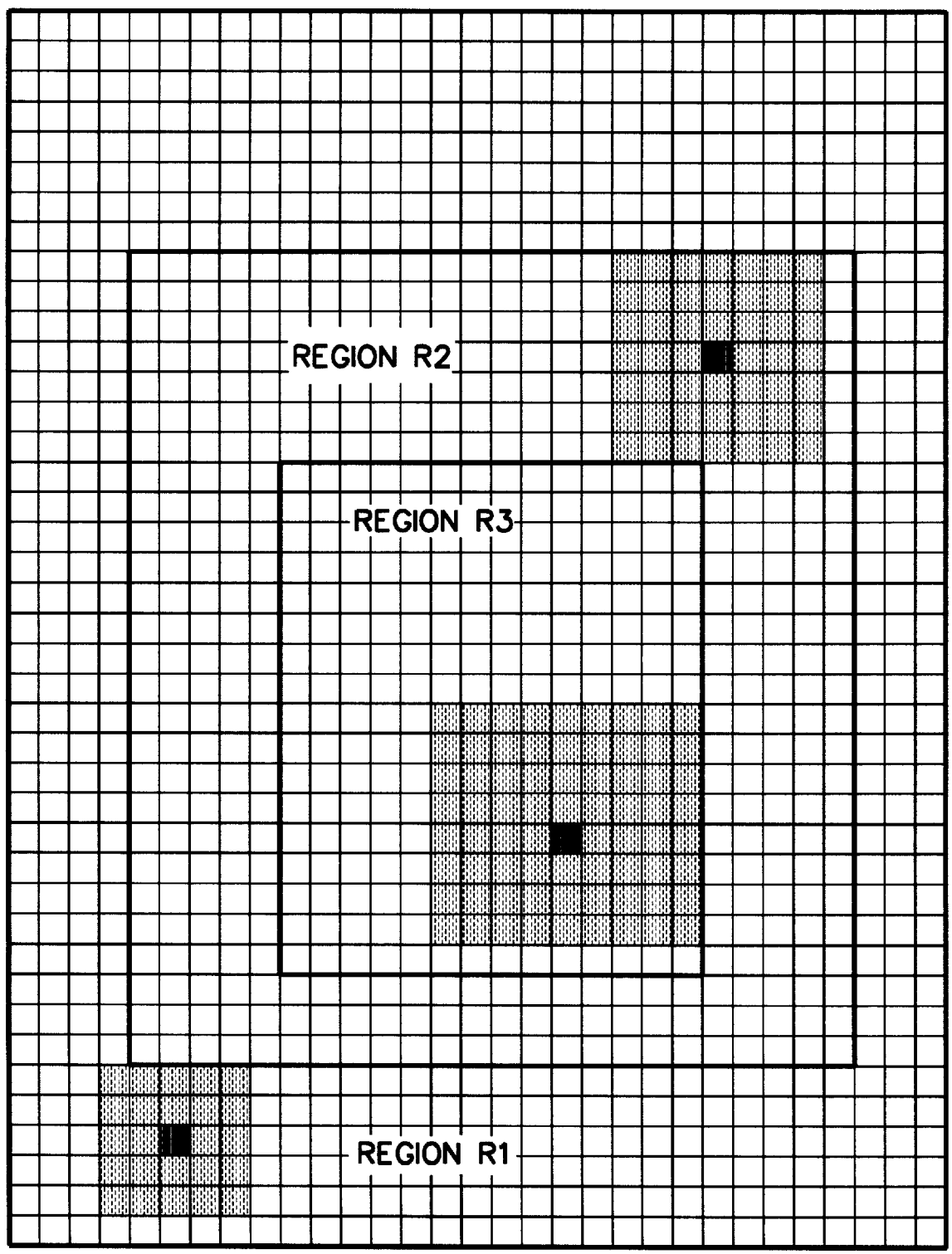
FIG. 7 shows an example of a picture partitioned into three regions, each having a unique search area for motion estimation and/or a unique target bits per macroblock in accordance with the present invention.

For an understanding of the invention, an example employing three regions will be described. The concept is not limited to three regions, but rather applies to partitioning of the picture into two or more regions. Further, the size, configuration and location of the regions are variable and depend upon desired picture quality for a particular region. As one example, FIG. 7 depicts a picture wherein a plurality of macroblocks are disposed in grid configuration. Each macroblock is located within one of three regions of the partitioned picture. In this example, region R3 comprises a center region, region R2 is an intermediate region and region R1 is a peripheral region. Regions R2 and R1 are concentric about region R3.

By way of one detailed example, an assumption is made that: a region R1' comprises an outermost macroblock on each edge of a picture, resulting in 146 macroblocks in R1'; a region R2' comprises two rows and three columns of macroblocks on the inside of region R1', meaning that region R2' includes 230 macroblocks; with the remaining macroblocks, i.e., 947 macroblocks being in a center region R3'.

The next step in accordance with the present invention is to adjust the motion estimation process for each region. The following description will detail adjustments only to the full-pel motion estimation step in a macroblock frame encoded P-picture. It is understood that there are other adjustment alternatives that can be applied to the full-pel motion estimation and that similar adjustments can be applied to the half-pel and/or dual prime motion estimation steps in accordance with the present invention. When processing a B-picture, there are many motion estimation alternatives that can be applied to the various motion estimation steps.

For a picture size of 720×480 pixels at 30 frames per second, the average processing time for a macroblock must be less than 24.7 microseconds. In this example, assume that the amount of time available for motion estimation, t(me), has been determined to be 18 microseconds per macroblock. The total picture motion estimation time, T(me), is then 24,300 microseconds.

Without the use of the invention, the balancing of the motion estimation parameters would typically result in the following implementation with all time units being in microseconds:

Full-pel search range for current frame search (fp_cfr) is +/− 32 horizontal and +/− 32 vertical.

Full-pel search range for current field f1 or f2 (fp_cf_, fp_cf2) is +/− 16 vertical.

Due to design limitations, there is insufficient time to perform opposite parity full-pel field searches.

$t(me)<=18$ $t(me)=t(fp)+t(hp)+t(dp)$

Assume that the motion estimation time of half-pel and dual-prime are equal to 4 microseconds each. Then full-pel motion estimation time must be:

$t(fp)<=t(me)-(t(hp)+t(dp))$ $t(fp)<=18-(4+4)$ $t(fp)<=10$

Assume further that for the following search range sizes, the associated motion estimation times are present:

Search range fp_cfr=+/− 32 H, +/− 32 V
 t(fp_cfr_pfr)=5 $\mu$s
Search range fp_cf1=+/− 16 H, +/− 16 V
 t(fp_cf1_pf1)=t(fp_cf1_pf2)=2 $\mu$s
Search range fp_cf2=+/− 16 H, +/− 16 V
 t(fp_cf2_pf1)=t(fp_cf2_pf2)=2 s By limiting the current macroblock field searches to only the same parity searches, the time for full-pel motion estimation will meet the t(fp)<=10 microseconds requirement.

$$t(fp) = \frac{t(fp\_cfr\_pfr) + t(fp\_cfl\_pf1) + t(fp\_cf1\_pf2)}{5} + \frac{t(fp\_cf2\_pf1) + t(fp\_cf2\_pf2)}{2}$$

$$t(fp) = 9\,\mu s$$

With use of this invention, the motion estimation parameters of the three regions can be adjusted to enhance the quality at the center of the picture. The motion estimation time will be reduced in the two non-center regions and the time savings will be used in the center.

In region R1', the following motion estimation parameters will be set.

Full-pel search range for current frame search (fp_cfr) is +/− 8 horizontal and +/− 8 vertical.

Do not perform full-pel search range for current field f1 or f2.

Do not perform half-pel searches.

Do not perform dual-prime searches.

The R1' full-pel motion estimation time t(fpR1), per macroblock, total R1' motion estimation time per macroblock, t(meR1) and total motion estimation time for R1', T(meR1) are calculated as shown.

Assume that for the following search range size, the associated motion estimation times are present:

Search range fpR1_cfr = +/− 8 H, +/− 8 V
 t(fpR1_cfr_pfr) = 2
t(fpR1) = t(fpR1_cfr_prf) +
 2
  t(fpR1_cf1_pf1) + t(fpR1_cf1_pf2) +
   ---          ---
  t(fpR1_cf2_pf1) + t(fpR1_cf2_pf2)
   ---          ---
t(fpR1) = 2
t(meR1) = t(fpR1) + t(hp) + t(dp)
t(meR1) =  2   +  ---  +  ---
t(meR1) = 2$\mu$s
T(meR1) = 292$\mu$s   (i.e., 146 macroblocks)

In region R2' the following motion estimation parameters will be set.

Full-pel search range for current frame search (fp_cfr) is +/− 16 horizontal and +/− 16 vertical.

Full-pel search range for current field f1 or f2 (fp_cf1, fp_cf2) is +/− 8 horizontal and +/− 8 vertical.

Do not perform full-pel current field opposite parity searches.

Perform half-pel searches.

Do not perform dual-prime searches.

The R2' full-pel motion estimation time, t(fpR2), per macroblock, total R2' motion estimation time per macroblock, t(meR2) and total motion estimation time for R2', T(meR2) are calculated as shown.

Assume that for the following search ranges, the associated motion estimation times are present:

```
Search range fpR2_cfr = +/- 16 H, +/- 16 V
    t(fpR2_cfr_pfr) = 3μs
Search range fpR2_cf1 - +/- 8 H, +/-8 V
    t(fpR2_cf1_pf1) = t(fp_cf1_pf2) = 1μs
Search range fpR2_cf2 = +/- 8H, +/- 8 V
    t(fpR2_cf2_pf1) = t(fp_cf2_pf2) = 1μs
t(fpR2) =   t(fpR2_cfr_pfr) +
                    3
            t(fpR2_cf1_pf1) + t(fpR2_cf1_pf2) +
                    1                     ---
            t(fpR2_cf2_pf1) + t(fpR2_cf2_pf2)
                   ---                   1
t(fpR2) = 5μs
t(meR2) = t(fpR2) + t(hp) + t(dp)
t(meR2) =   5     +   4   +  ---
t(meR2) =      9μs
T(meR2) = 2070μs (i.e., 230 macroblocks)
```

In region R3', the following motion estimation parameters will be set.

T(meR3)<=24,300−(292+2070)=21,938 t(meR3)<=21,938/974 macroblock t(meR3)<=22.5 μs

Perform all searches.

t(fpR3)<=22.5−(t(hp)+t(dp))

t(fpR3)<=22.5−(4+4)

t(fpR3)<=14.5

Additional time can be used to expand range for full-pel current frame search.

Full-pel search range for current frame search (fp_cfr) is +/− 48 horizontal and +/− 48 vertical.

Full-pel search range for current field f1 or f2 (fp_cf1, fp_cf2) is +/− 16 horizontal and +/− 16 vertical.

Perform all full-pel current field searches.

Perform half-pel searches.

Perform dual-prime searches.

The R3' full-pel motion estimation time, t(fpR3), per macroblock, total R3' motion estimation time per macroblock, t(meR3) and total motion estimation time for R3', T(meR3) are calculated as shown.

```
Search range fpR3_cfr = +/- 48 H, +/- 48 V
Search range fpR3_cf1 = +/- 16 H, +/- 16 V
Search range fpR3_cf2 = +/- 16 H, +/- 16 V
t(fpR3) =   t(fpR3_cfr_pfr) +
                    6.5
            t(fpR3_cf1_pf1) + t(fpR3_cf1_f2) +
                   2                    2
            t(fpR3_cf2_pf1) + t(fpR3_cf2_pf2)
                   2                    2
t(fpR3) = 14.5
t(meR3) = t(fpR3) + t(hp) + t(dp)
t(meR3) =  14.5     4    +   4
t(meR3) =  22.5μs
T(meR3) = 21915μs (i.e., 974 macroblocks)
```

In this example, the invention has allowed for two additional searches, the opposite parity, full-pel field searches and an expanded search range on the full-pel current frame search for the 974 macroblocks in the center of the picture by restricting the motion estimation time for the 376 macroblocks in the two perimeter regions. This will allow for much better motion estimation and compression of the center of the picture. As required, the total motion estimation time for the picture is still less than 24,300 microseconds.

$$T(me)=T(meR1)+T(meR2)+T(meR3)=292+2070\ 21915=24,277$$

In addition to total motion estimation time, various encoding parameters can be adjusted for each macroblock or picture depending upon its location within one of several defined regions on the picture. For example, bit allocation is another encoding parameter which will have an affect on perceived picture quality. The basis for bit allocation is a specified bit rate for the encoded video stream. The bit rate is defined in bits per second. Based on the macroblock frame rate and type of picture being encoded, a number of bits per picture is assigned. For example, at 6,000,000 bits per second (6 Mbps), with pictures at 30 frames per second, each picture would be allocated 200,000 bits assuming the bits were allocated uniformly. With a 720×480 picture (1350 macroblocks) there would be 148 bits allocated per macroblock.

The bit rate control algorithm of the digital video encoder will use the allocated bits per macroblock as a target for encoding the macroblock and will set an appropriate quantization value. A simple algorithm is to set a quantization value based on the value of the target bits. More sophisticated algorithms can incorporate pre-processing and feedback to provide additional information that can be used to adjust the quantization.

Figure 6:
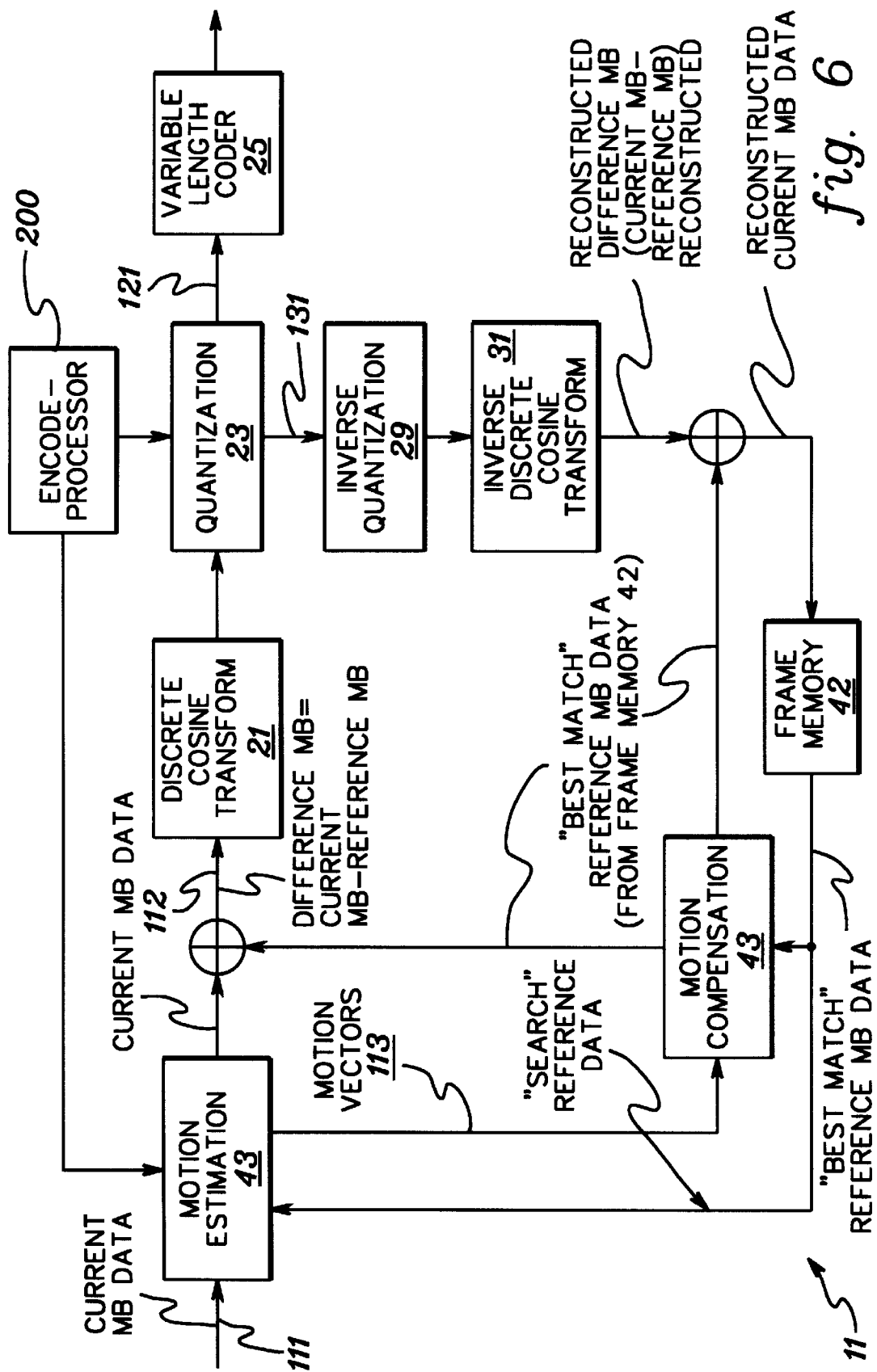
FIG. 6 shows a modified flow diagram of a generalized MPEG2 compliant encoder employing an encoder processor 200 for controlling setup of motion estimation and target bits per macroblock in accordance with the present invention.

The adjustment of target bits per macroblock (as well as other encoding parameters such as motion estimation parameters) is a function of an encoder processor 200 embedded in the encoder which has the ability to adjust the necessary values under software control. In FIG. 6, encoder processor 200 is shown connected to both the motion estimation processing 43 to control one or more motion estimation parameters, and the quantizer 23, to control the quantization value based upon a set target bits per macroblock. Implementation of processor 200 with software in accordance with this invention can be readily undertaken by one skilled in the art based upon the discussion presented herein. Processor 200 essentially controls the setup of the motion estimation and target bits per macroblock values.

In accordance with the present invention, the number of bits allocated per macroblock is adjusted based on the position of the macroblock within the picture, i.e., which region of a partitioned picture the macroblock is located. Based on the three regions defined in the example, the following number of bits per macroblock (MB) could be allocated in accordance with this invention for each region:

Region 1—50 bits/MB. Total Region 1 bits=7.3K

Region 2—100 bits/MB. Total Region 2 bits 23K

Region 3—174 bits/MB. Total Region 3 bits=169.5K

With the above numbers, the total bits per picture meets the required 200,000 bits. However, by selectively distributing the target bits per macroblock, the center region of the picture is allocated nearly 20% more target bits per macroblock then before the invention. The higher target value is factored into the bit allocation algorithm and would result in lower quantization in the center region of the picture, and therefore, higher picture quality.

Those skilled in the art will note from the above discussion that several approaches are presented herewith for enhancing picture quality based on controlling selected encoding parameters employed in a digital video encoder. In all aspects, the picture is initially partitioned into multiple regions, such as a center region and a peripheral region. An encoding parameter, such as a motion estimation parameter or target bits per macroblock, is then adjusted for each macroblock based upon the location of the macroblock within the multiple regions of the picture. The invention does not attempt to define the boundaries of the regions or the specific encoding parameters to be adjusted. Such details can be defined based on the source material, application or other criteria. The motion estimation and target adjustments are independent; however, both concepts can be employed together to provide a greater ability to selectively optimize picture quality.

The present invention can be included in an article of manufacture (e.g., one or more computer program products) having, for instance, computer usable media. The media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. A method for processing a picture having a plurality of macroblocks, said method comprising:

partitioning the picture into at least two regions; and setting a motion estimation parameter for each macroblock of the picture based upon which region of said at least two regions of the picture said macroblock is located.

2. The method of claim 1, wherein said setting further comprises setting a target bits per macroblock for each macroblock of the picture based upon which region of said at least two regions of the picture said macroblock is located.

3. The method of claim 2, wherein the at least two regions comprises a center region and at least one outer region, and said motion estimation parameter comprises total time for motion estimation processing of the macroblock, and wherein said setting comprises setting a higher total time for motion estimation processing of each macroblock in the center region of the picture compared with total time for motion estimation of each macroblock in the at least one outer region of the picture, and wherein said setting of the target bits per macroblock for each macroblock comprises providing x target bits per macroblock for macroblocks within the center region of the picture and y target bits per macroblock for each macroblock located in the at least one outer region of the picture, wherein x>y.

4. The method of claim 1, wherein said at least two regions of said partitioning comprises a center region of the picture and at least one outer region of the picture disposed outside the center region, and said method further comprises setting the motion estimation parameter for each macroblock to enhance picture quality in the center region of the picture compared with picture quality in the at least one outer region of the picture.

5. The method of claim 4, wherein said motion estimation parameter comprises total time for motion estimation processing of the macroblock, and wherein said setting comprises setting a higher total time for motion estimation processing of each macroblock in the center region of the picture compared with total time for motion estimation processing of each macroblock in the at least one outer region of the picture.

6. The method of claim 4, wherein said motion estimation parameter comprises motion estimation search type, motion estimation search area, or number of motion estimation searches for motion estimation processing of the macroblock, and wherein said setting comprises setting a more complete motion estimation search type, motion estimation search area, or number of motion estimation searches for motion estimation processing of each macroblock in the center region of the picture compared with that of each macroblock in the at least one outer region of the picture.

7. The method of claim 4, wherein said motion estimation parameter comprises motion estimation search type for motion estimation processing of the macroblock, and wherein said setting comprises providing full estimation searching for each macroblock in the center region of the picture and only partial motion estimation searching for each macroblock in the at least one outer region of the picture.

8. The method of claim 4, wherein the at least one outer region of said picture comprises two outer regions, a first outer region encircling said center region, and a second outer region encircling said first outer region, said second outer region comprising a peripheral region of the picture, and said method further comprises setting the motion estimation parameter for each macroblock of the picture to enhance picture quality of the macroblocks in the first outer region compared with the macroblocks in the second outer region and to enhance picture quality of the macroblocks in the center region compared with the macroblocks in the first outer region.

9. The method of claim 8, wherein said motion estimation parameter comprises a total time for motion estimation processing of the macroblock, and wherein said setting comprises setting a highest total time for motion estimation processing of macroblocks within the center region, an intermediate total time for motion estimation processing of macroblocks within the first outer region, and a lowest total time for motion estimation processing of macroblocks within the peripheral region.

10. A digital video encoder system for processing a picture having a plurality of macroblocks, said digital video encoder system comprising:

means for partitioning the picture into at least two regions; and means for setting a motion estimation parameter for each macroblock of the picture based upon which region of said at least two regions of the picture said macroblock is located.

11. The digital video encoder system of claim 10, wherein said motion estimation parameter comprises one of a total time for motion estimation processing, a motion estimation search type, a motion estimation search area, or a number of motion estimation searches performed.

12. The digital video encoder system of claim 10, wherein said at least two regions of said picture comprises a center region of the picture and at least one outer region of the picture disposed outside the center region, and wherein said means for setting comprises means for setting the motion estimation parameter for each macroblock of the picture so as to enhance picture quality in the center region of the picture compared with picture quality in the at least one outer region of the picture.

13. The digital video encoder system of claim 12, wherein said at least one outer region comprises multiple outer regions, each outer region of said multiple outer regions being concentric with said center region, and wherein said means for setting comprises means for setting the motion estimation parameter for each macroblock of the picture such that picture quality lessens from the center region through each outer region of said multiple outer regions to a periphery of the picture.

14. The digital video encoder system of claim 12, wherein said motion estimation parameter comprises a total time for motion estimation processing of the macroblock, and wherein said means for setting comprises means for setting the total time for motion estimation processing of the macroblock and a target bits per macroblock to enhance picture quality in the center region of the picture compared with picture quality in the at least one outer region of the picture.

15. The digital video encoder system of claim 14, further comprising motion estimation logic and a quantizer, said motion estimation logic employing said total time for motion estimation of each macroblock provided by said means for setting, and said quantizer employing said target bits per macroblock provided by said means for setting.

16. A computer program product comprising a computer usable medium having computer readable program code means therein for use in processing a picture having a plurality of macroblocks, said computer readable program code means in said computer program product comprising:

computer readable program code means for causing a computer to effect partitioning of the picture into at least two regions; and computer readable program code means for causing a computer to effect setting of a motion estimation parameter for each macroblock of the picture based on which region of the at least two regions of the picture the macroblock is located.

17. The computer readable program code means of claim 16, wherein the at least two regions of the picture comprises a center region of the picture and at least one outer region of the picture, said at least one outer region being disposed outside the center region, and wherein said computer readable program code means for causing a computer to effect setting of the motion estimation parameter comprises computer readable program code means for causing a computer to effect setting the motion estimation parameter for each macroblock to enhance picture quality in the center region of the picture compared with picture quality in the at least one outer region of the picture.

18. The computer readable program code means of claim 17, wherein said computer readable program code means for causing a computer to effect setting further comprises computer readable program code means for causing a computer to effect setting a target bits per macroblock for each macroblock to enhance picture quality in the center region of the picture compared with picture quality in the at least one outer region of the picture.

19. The computer readable program code means of claim 17, wherein said computer readable program code means for causing a computer to effect setting further comprises computer readable program code means for causing a computer to effect setting of the motion estimation parameter and a target bits per macroblock for each macroblock of the picture based upon which region of the at least two regions of the picture the macroblock is located.

* * * * *

UNITED STATES PATENT AND TRADEMARK OFFICE
CERTIFICATE OF CORRECTION

PATENT NO. : 5,920,359
DATED : July 06, 1999
INVENTOR(S) : Curley et al.

It is certified that error appears in the above-indentified patent and that said Letters Patent is hereby corrected as shown below:

Col. 6, line 23, delete "08/831-157" and replace with --08/831,157--.

Col. 8, line 9, delete "t(hp_cfp2_ff2)" and replace with --t(hp_cf2_ff2)--.

Col. 9, line 43, delete "(fp_cf_," and replace with --(fp_cf1,--.

Col. 10, line 2, delete "=2 s" and replace with -- =2$\mu$s --.

Signed and Sealed this

Sixteenth Day of November, 1999

Attest:

Q. TODD DICKINSON

Attesting Officer

Acting Commissioner of Patents and Trademarks